United States Patent
Saladino

(10) Patent No.: US 7,690,052 B2
(45) Date of Patent: Apr. 6, 2010

(54) HEADWEAR HAVING ONE-PIECE ADJUSTABLE INTEGRATED VIEWING PROTECTIVE SECTION

(76) Inventor: Gregory Saladino, 1815 Glasgow Rd., Cardiff by the Sea, CA (US) 92007

( * ) Notice: Subject to any disclaimer, the term of this patent is extended or adjusted under 35 U.S.C. 154(b) by 0 days.

(21) Appl. No.: 11/786,593

(22) Filed: Apr. 13, 2007

(65) Prior Publication Data

US 2008/0250538 A1 Oct. 16, 2008

(51) Int. Cl.
*A42B 1/06* (2006.01)
(52) U.S. Cl. ............... 2/173; 2/203; 2/204; 2/425; 2/10; 2/171.8; 2/175.6
(58) Field of Classification Search ............ 2/203, 2/204, 209, 195.8, 424, 100, 452, 6.3, 6.5, 2/6.7, 425, 15, 10, 427, 431, 175.6, 209.13, 2/173, 171.8, 171.6, 209.14, 9, 410
See application file for complete search history.

(56) References Cited

U.S. PATENT DOCUMENTS

| | | | | |
|---|---|---|---|---|
| 768,276 | A * | 8/1904 | Fox ........................... | 2/10 |
| 798,877 | A * | 9/1905 | Conne ........................ | 2/10 |
| 853,809 | A * | 5/1907 | Liebeskind .................. | 2/10 |
| 945,839 | A * | 1/1910 | Brisbane ..................... | 602/74 |
| 1,200,528 | A * | 10/1916 | Ryder ......................... | 2/203 |
| 2,133,619 | A * | 10/1938 | Hutton ........................ | 2/172 |
| 2,199,473 | A * | 5/1940 | Wengen ...................... | 2/172 |
| 2,682,667 | A * | 7/1954 | Michelstetter ............... | 2/205 |
| 2,705,802 | A * | 4/1955 | Tellier ......................... | 2/68 |
| 3,157,887 | A * | 11/1964 | Rothstein .................... | 2/203 |
| 4,193,133 | A * | 3/1980 | Laibach et al. .............. | 2/10 |
| 4,686,712 | A * | 8/1987 | Spiva ........................... | 2/10 |
| 4,712,254 | A * | 12/1987 | Daigle ......................... | 2/452 |
| 4,796,308 | A * | 1/1989 | Bourgeois ................... | 2/10 |
| 5,341,516 | A * | 8/1994 | Keim .......................... | 2/452 |
| 5,421,037 | A * | 6/1995 | Schulze ....................... | 2/452 |
| 5,617,589 | A * | 4/1997 | Lacore et al. ................ | 2/452 |
| 5,937,439 | A * | 8/1999 | Barthold et al. ............. | 2/10 |
| 6,047,401 | A * | 4/2000 | Traumer ...................... | 2/10 |
| 6,088,838 | A * | 7/2000 | Sontag ........................ | 2/202 |
| 7,131,148 | B1 * | 11/2006 | Traumer ...................... | 2/426 |
| 2006/0117450 | A1 * | 6/2006 | Matsumoto .................. | 2/10 |

\* cited by examiner

*Primary Examiner*—Gary L Welch
*Assistant Examiner*—Alissa J Tompkins
(74) *Attorney, Agent, or Firm*—Marvin Gordon

(57) ABSTRACT

A hat or cap includes a main hat portion and an outerband or fold-down portion secured to the main hat portion in a manner that permits the outerband to be moved upward and downward with respect to the main hat portion from a first position, in which the outerband lies over the main hat portion and away from the wearer's face and eyes, to a second position in which the outerband covers and protects a part of the wearer's face including the eyes. A lens or goggle portion, which is integrated into and attached to an opening in the outerband, is positioned over the wearer's eyes when the outerband is in its second, lower position.

4 Claims, 13 Drawing Sheets

HEADWEAR HAVING ONE-PIECE ADJUSTABLE INTEGRATED VIEWING PROTECTIVE SECTION

BACKGROUND OF THE INVENTION

The present invention relates generally to headwear, and more particularly to a cap having a protective see-through section.

During certain wintertime activities, such as skiing and snowboarding, a goggle is worn over a typically woolen hat or cap to allow the wearer to see while protecting his eyes from snow, rain, ice and the like. The goggle is typically strapped around the back of the head to retain the goggle in place. In many cases, a gap may exist between the goggle and hat which permits wind, rain, debris or snow to reach the wearer's eyes. These gaps may be present on the sides of the goggle where the goggle rests against the hat, at the top of the goggle where it contacts the lower brim of the hat, or at the lower perimeter of the goggle where it rests on the wearer's cheek bones. These openings may cause discomfort, or, in extreme cases, even frostbite It is also desirable that a sufficient degree of warmth be provided to the wearer's face. To this end, many skiers wear a ski mask or a neck warmer over the mouth, cheekbones and nose, underneath the goggle. This prevents the goggle from fitting properly against the face, and also allows the wearer's breath to be trapped inside the mask and goggle, thereby condensing and fogging the interior lens of the goggle.

The conventional arrangement of cap and protective goggle thus does not allow for an effective joining of the two, nor does it provide reliable protection for the wearer's upper face and head when they are worn together. It is also inconvenient requiring that the hat and goggle both be separately carried and stored, often leading the ski enthusiast to misplace one or the other. There thus exists a need for a one-piece adjustable head and eye protective covering for use particularly in winter sports and other outdoor activities. There is also a need for a hat that is convertible for use at different weather conditions at different times of the year. These needs have long been recognized as evidenced by the numerous prior attempts to achieve a better cap and goggle arrangement that are described in numerous prior patents.

For example, U.S. Pat. No. 768,276 discloses a face mask attached inside of a cap which folds down over the eyes. This design, however, is effective only when the hat fits the wearer's head with a near exact fit. The mask is not adjustable to conform to the unique features of the wearer's face.

U.S. Pat. No. 798,877 discloses a cap having multiple positions with a mask embedded into the fabric. To position the cap to a different position, the wearer must remove the cap and unfold the hat to allow the goggle to cover the eyes. This may prove to many to be a relatively complicated and time-consuming process. In addition, when the goggle is tucked away, its outer lens is exposed to the wearer's hair, allowing for hair gel and similar materials to contaminate the lens and degrade its clarity and transparency. The mask-cap disclosed in U.S. Pat. No. 164,573 includes a skirt having mouth and eye openings with a protective shield over the latter. The construction is relatively complex and costly to manufacture and is not readily adjustable for different head sizes and shapes. U.S. Pat. Nos. 4,918,753; 3,262,125; and 6,845,548 disclose a goggle attached by a strap and various mechanical mechanisms to a helmet. The goggle is movable between an up position when not in use and a down position when in use. The goggle can be physically removed from the helmet and can thus be misplaced. Gaps are present at those sites at which the goggle contacts the face, thereby allowing wind, rain and snow to reach the wearer's face and eyes.

Patent Pub. No. 2006/0117450 discloses a goggle attached to a head cover in which the goggle-like strap is secured to the head cover by means of Velcro. As in the earlier-described prior designs, the goggle is readily separable from the head cover and can thus be misplaced. Moreover, the Velcro attachment can wear out over time, so that the goggle may unexpectedly become detached from the head cover, thereby creating a possibly dangerous condition.

U.S. Pat. No. 3,173,147 discloses a relatively complex one-piece headwear construction in which an adjustable lens is attached to a headband. The goggle portion of the lens may be positioned up or down. This headwear item does not provide warmth to the wearer's face and fails to fully cover the upper part of the face and head at the same time, thereby leaving openings for debris, wind, rain and snow to contact the wearer's face. Furthermore, the adjustment of the goggle portion can alter the fit of the main headband portion, thereby to create an uncomfortable wearing experience.

U.S. Pat. No. 5,752,280 discloses a one-piece complex mechanical device for attaching an adjustable goggle portion to a headband to allow the adjustable lens to be moved up and down. In this construction it is difficult to readily remove the lens portion without taking apart the hinge mechanism, which makes it difficult to clean the material of the headband.

BRIEF SUMMARY AND OBJECTS OF THE INVENTION

It is accordingly an object of the present invention to provide a one-piece adjustable hat in which the goggle is integrated into a fabric fold-down or outerband of the hat.

It is another object of the present invention to provide a one-piece hat and goggle in which unwanted gaps between the goggles and the wearer's face are substantially eliminated.

It is a further object of the present invention to provide a winter or ski hat in which the upper portion of the wearer's face, eyes, and ears is reliably protected while permitting vision through a transparent lens or goggle section incorporated into the hat.

It is yet a further object of the invention to provide a hat or cap of the type described in which separation and possible misplacement of the goggle from the hat is effectively prevented.

It is a more general object of the present invention to provide a winter or ski hat which is convenient to use and provides reliable protection from the cold and environment.

It is a further object of the present invention to provide a hat that can be adapted to fit a wide variety of wearers having different sizes and shapes of heads and faces.

It is another object of the present invention to provide a one-piece, adjustable hat or cap in which its different configurations can be achieved relatively easily and quickly.

It is yet another object of the present invention to provide a convertible hat or cap in which the outerband can be readily separated from the main hat portion to adapt the hat for use during different seasons.

SUMMARY OF THE INVENTION

To these ends, the head covering or hat of the invention includes a main hat portion, which covers the top of the wearer's head, and an outerband or fabric fold-down that is fastened or otherwise attached to the main hat portion in a manner that allows the outerband to be pivoted upward to a first position in which it does not extend over the wearer's face, and downward to a second position in which it covers a portion of the wearer's face including the eyes. In accordance with the invention, the outerband includes a goggle or lens portion integrated therein and secured thereto which is positioned over the wearer's eyes when the outerband is in its lower position, while the fabric portion of the outerband provides warmth and protection to the covered portion of the face. In another aspect of the invention, the hat may include a chord lock mechanism and cinchcord that are used to tighten and/or loosen the outerband to provide the desired snug fit of the outerband without physically removing the hat.

DESCRIPTION OF THE DRAWINGS

To the accomplishment of the above and to such other objects as may hereinafter appear, the present invention relates to a one-piece adjustable and convertible hat construction, substantially as defined in the appended claims and as described in the following specification as considered with the accompanying drawings in which:

DETAILED DESCRIPTION OF THE PREFERRED EMBODIMENTS

Figure 1:
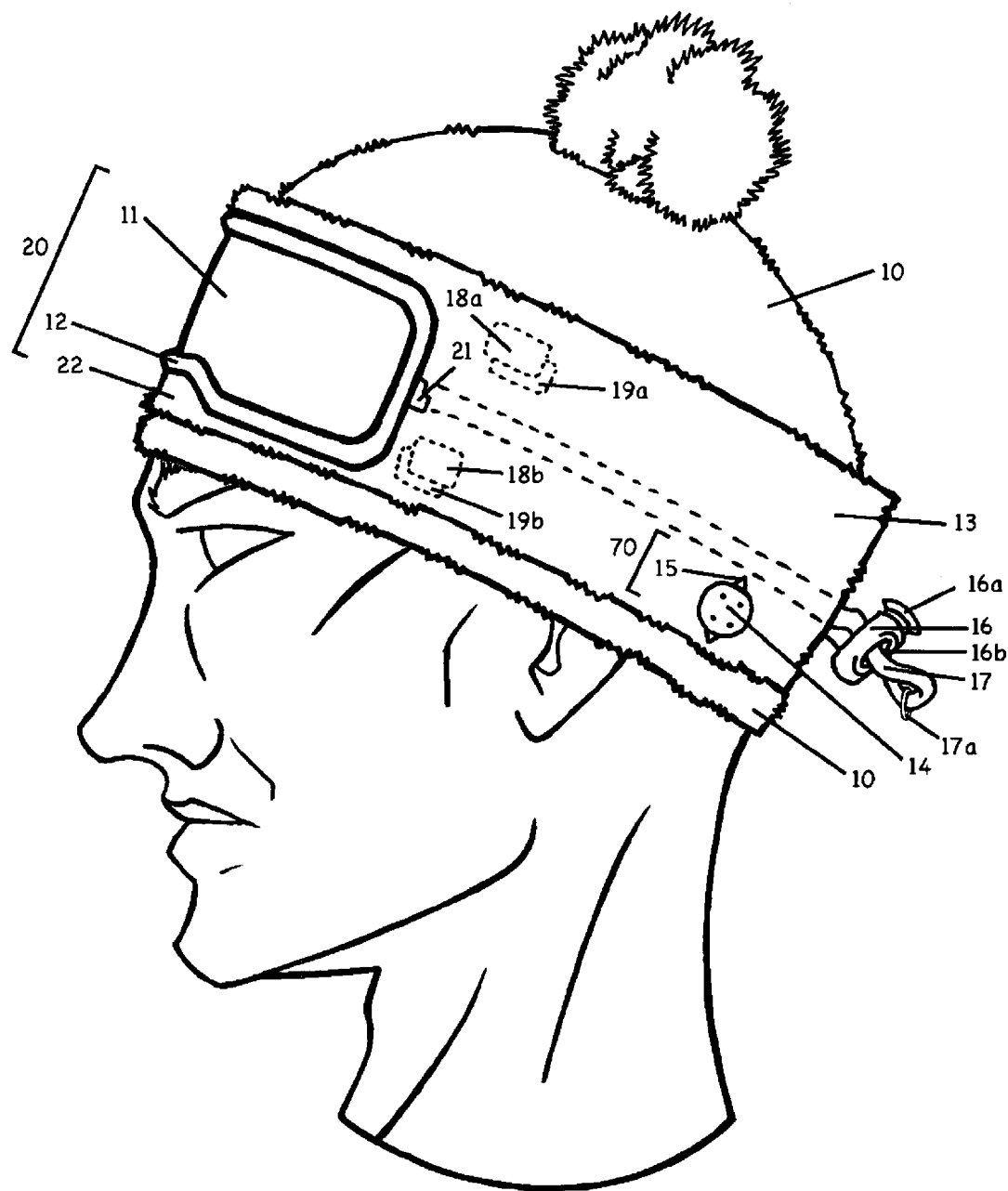
FIG. 1 is a side elevation of the hat of the invention according to a first embodiment thereof with the outerband in the upper position.
Figure 2:
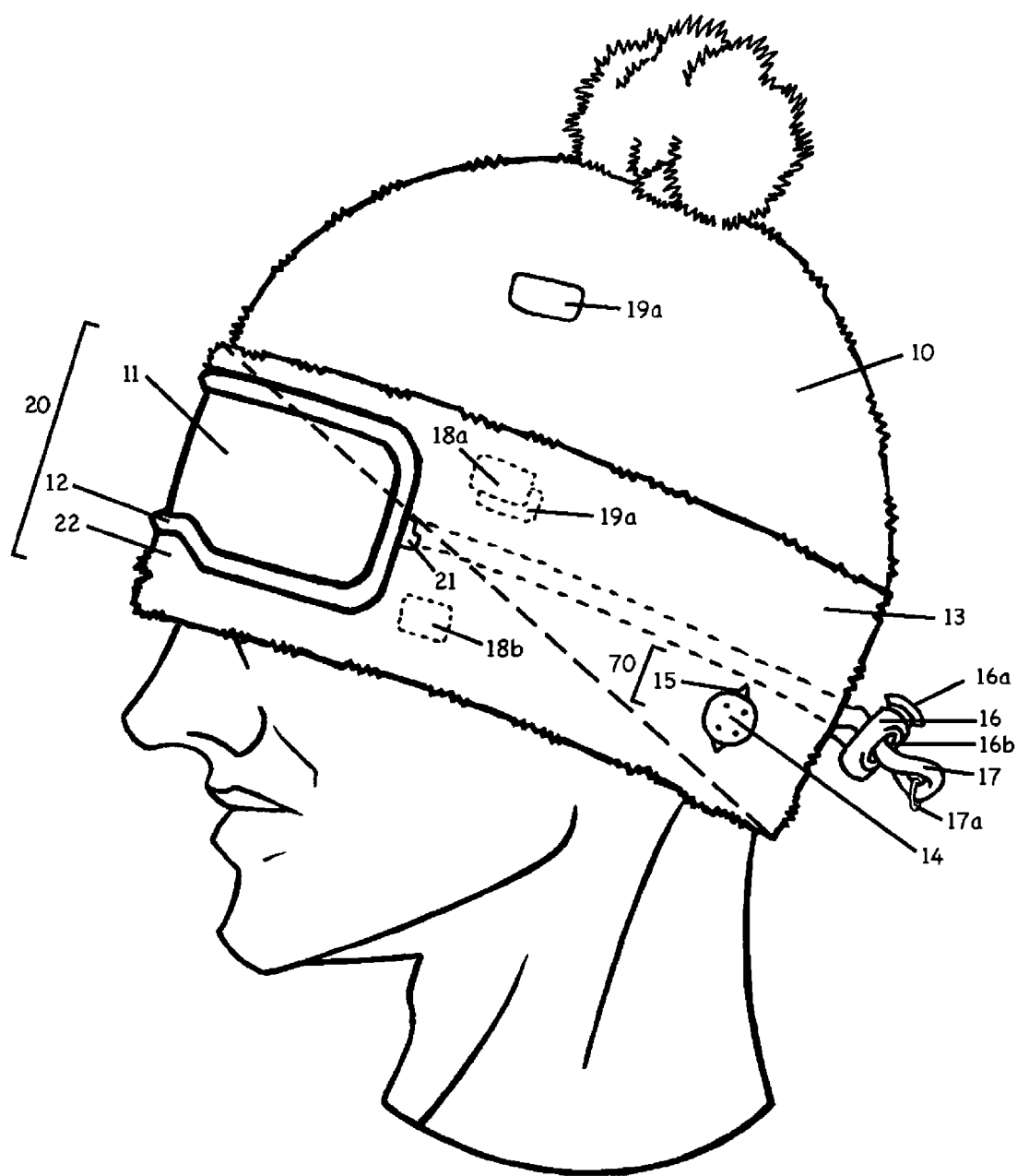
FIG. 2 is a side elevation of the hat of FIG. 1 with the outerband shown in the lower position.
Figure 3:
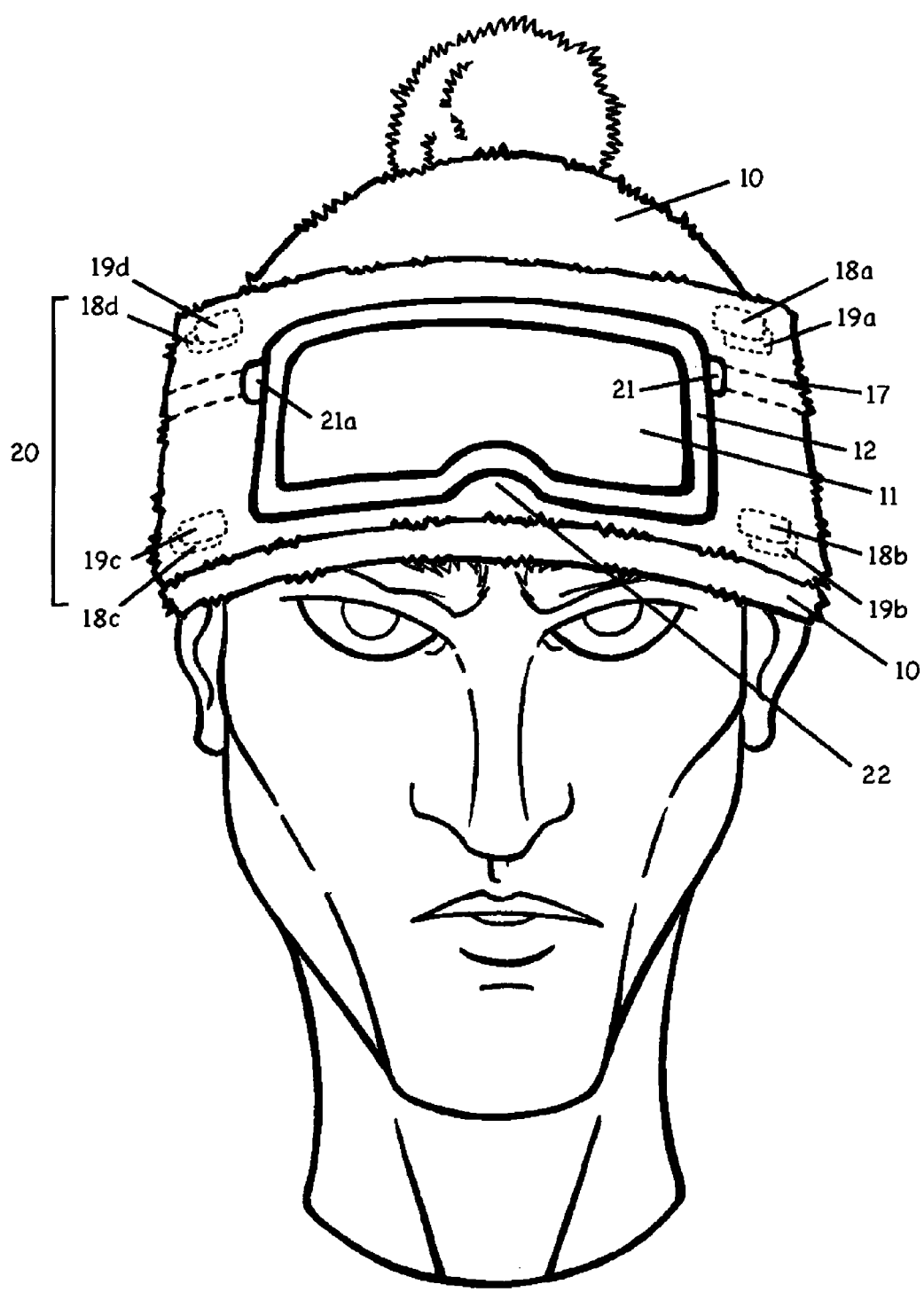
FIG. 3 is a front elevation of the hat of FIG. 1 with the outerband in its upper position.
Figure 4:
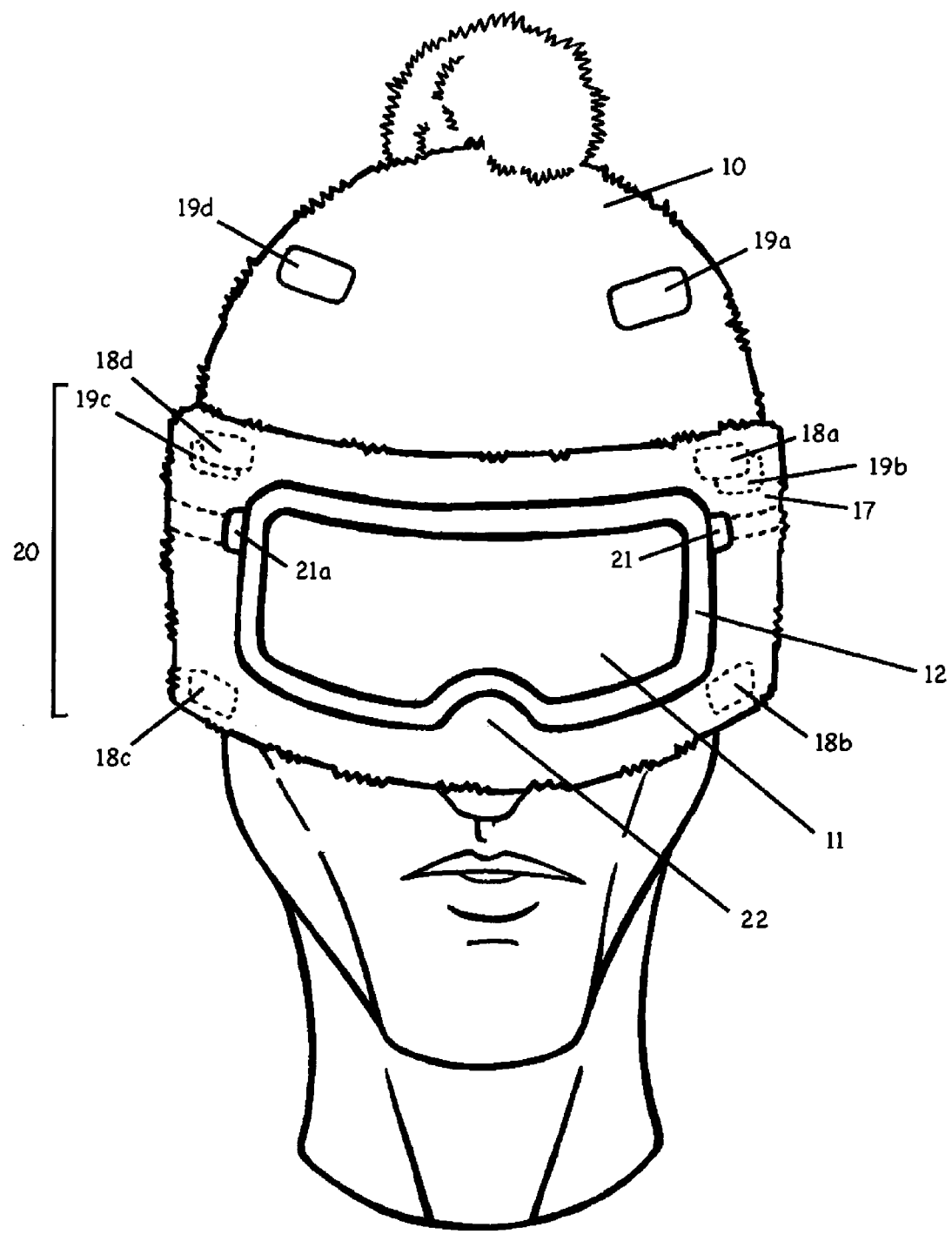
FIG. 4 is a front elevation of the hat of FIG. 1 with the outerband in its lower position.

Referring now to the drawings, there is shown in FIGS. 1 and 2 a first embodiment of the hat of the invention, which includes, as therein shown, a main hat portion 10 that covers the top of the wearer's head. An outerband 13 of variable width is attached to hat portion 10 by means of a button 14, which is sewn into hat portion 10. Button 14 is inserted through a slit 15 provided at the rear of outerband 13, thereby to secure outerband 13 to main hat portion 10 in a manner that permits outerband 13 to pivot upward and/or downward with respect to hat portion 10. To this end, button 14 along with slit 15 form a pivoting point or area designated as 70. Main hat portion 10 and outerband 13 may be made of any natural or synthetic fiber typically used in ski hats or the like, including wool, canvas, cotton, nylon or polyester. Main hat portion 10 may extend partially of completely over the wearer's face with eye, nose and mouth holes as in a conventional ski mask.

In accordance with one aspect of the invention, a rectangular, transparent lens or goggle section generally designated 20 is incorporated or embedded in a similarly shaped cutout formed in the front of outerband 13 by means, as herein shown, of a rigid or flexible plastic/rubber encasement 12 that encases a lens 11 and is secured to the perimeter of the cutout in outerband 13. Lens 11 may be of any convenient shape or shade in addition to the rectangular shape shown. The lens may be either a single layered lens or a dual layered lens of the type commonly used in a conventional ski goggle.

Plastic/rubber encasement 12 may be sewn or attached to outerband 13 by means of an interior flange such as the one described in greater detail below with reference to FIGS. 8 and 9. Alternatively, lens 11 may include holes about its perimeter, allowing it to be sewn directly into outerband 13 such as by threading string through these holes and through the fabric of the outerband, thereby to secure lens 11 to the outerband.

In use, the wearer takes hold of the outerband 13, which preferably is made of a material having some flexibility or elasticity, and pulls it from its position shown in FIG. 1, in which the outerband 13 and its integrated lens 11 overlie the main hat portion 10 and are positioned above and away from the wearer's face and eyes, slightly outward away from the forehead and slides the outerband over his face to the position shown in FIG. 2, in which the lens or goggle 11 or goggle 20 covers the wearer's eyes and the remaining fabric portion of outerband 13 covers the rest of the upper part of the face. When the outerband is in its protective, downward position shown in FIG. 2, the lower, front portion 22 of the outerband is below the goggle portion 20 and acts as a total or partial protective cover for the nose. In this manual operation, buttons 14 and slits 15 on each side of the hat are used as pivot points, button 14 remaining stationary, secured to hat portion 10, while slit 15, which is part of outerband 13, swivels or pivots upward and downward about button 14.

Instead of the use of button 14 and slit 15, a metal button snap attachment, also known as snap fastener, snap, popper, and press stud, may be used to provide the pivoting relation between the hat portion 10 and outerband 13. Alternatively, a Velcro attachment may be used such as in the form of a tab. In this latter configuration, a tab with hooks would be sewn into the outer part of hat portion 10 in the same general location as that of the button 14 in the embodiment shown in FIG. 1. The Velcro attachment would bond to loops that would be sewn into the interior of outerband 13. Although the Velcro bend would remain intact during the upward and downward relative movement of the outerband 13, the elasticity of the material of the outerband would allow for such movement. A chord lock 16 having an elastic string 17 and Velcro bonds 18 and 19 may be provided to achieve a more snug fit of the hat on the wearer's head.

Outerband 13 may be sewn to main hat portion 10 by at least one stitch, generally in attachment area 70 where button 14 protrudes through slit 15. The attachment area 70 may consist of the aforementioned button/slit arrangement, metal button snap attachment, or Velcro attachment that may be located in a variety of positions on main hat portion 10 and its related area on outerband 13. One such position, which allows outerband 13 to pivot up and down is for attachment area 70 to be a single attachment point at the rear of main hat portion 10. This arrangement, which allows outerband 13 to be anchored at the rear of main hat portion 10, transfers the tension from the sides to the rear of the outerband, further allowing outerband 13 to be adjusted independently in a manner that does not affect the position or fit of main hat portion 10. The elasticity of the material surrounding the attachment means at attachment area 70 allows the outerband to move up and down.

When it is desired that the outerband 13 not cover the wearer's face and eyes, as in FIG. 1, the wearer pulls outerband 13 slightly outward and upward and then pivots or slides the outerband upward to return it to the rest position shown in FIG. 1. The outerband remains in its selected position of either that shown in FIG. 1 or FIG. 2, as a result of the tension of the natural elasticity of its material.

As seen in FIGS. 1-4, outerband 13 may be provided with similar Velcro tabs 18a, 18b, 18c and 18d, which, acting with similar tabs 19a, 19b, 19c and 19d on the main hat portion 10 to removably secure the main hat portion 10 to the outerband. When outerband 13 is in its upward position of FIG. 1, opposite Velcro tabs 18a and 19a are temporarily mated or bonded, as are tabs 18b and 19b, 18c and 19c, and 18d and 19d. When the wearer desires to slide outerband 13 over his eyes and face, to the position of FIG. 2, he detaches by hand all of the previously mated pairs of Velcro tabs 18 and 19. The wearer then slides outerband 13 downward over his eyes and reattaches tab 18a to tab 19b and tab 18d to tab 19c, as seen in FIG. 2. Button tabs or a button/slit attachment may be used in place of tabs 18 and 19to achieve the support desired to retain the outerband in its desired position.

As can be seen in FIGS. 1 and 2, a cinchcord 17, also known as an elastic strip, is embedded or sewn into outerband 13. Cinchcord 17 is secured to both sides of rubber/plastic encasement 12 at attachment points 21 and 21a. The elastic strip 17 begins at point 21 on the left side of the outerband and, while embedded in the outerband, continues to the rear at which strip 17 exits the outerband, passes through hole 16b of cinchcord 16 by a distance, say, of one inch, and then passes through a stopper 17a, which prevents the loop of strip 17 from sliding through hole 16b. Elastic strip 17 then changes direction forming the loop, and then returns through hole 16b. Strip 17 re-enters the fabric of outerband 13 where it continues until it reaches goggle portion 20 at attachment point 21a.

To operate the chord lock 16, the wearer holds it with one hand and presses down on button 16a with a finger of the same hand, and with the other hand, he pulls or tightens elastic strip 17 through hole 16b until the desired snugness of fit of the outerband is achieved, and then releases button 16a to keep the fit constant. To loosen the elastic strip and outerband 13, the wearer presses down on button 16a, thereby releasing the tension in the elastic strip and loosening the fit of outerband 13.

The chord lock system may be modified so as to require the use of only one hand to tighten or loosed the cinchcord. In this alternate construction, the chord lock would have an alternate loop threaded through it, which would be separately attached to outerband 13 or main hat portion 10, thereby securing the chord lock to a maximum set distance from outerband 13. The wearer would grab hold of cinchcord 17 and pull it away from his head. The alternate loop threaded through hole 16b would retain the chord in a set position as cinchcord 17 forces its way through hole 16b, which is engaged, thereby tightening outerband 13 to create a more snug fit.

Chord lock 16 may also be positioned on the side of the hat rather than in the rear, or two chord locks may be employed at the same time on both sides of the outerband. In addition, a series of web-like systems of chord locks may be used to achieve a more snug fit of the outerband.

The lower portion 22 of outerband 13 may extend completely over the lower portion of the wearer's face covering the nose, mouth, chin and neck, if desired. The extended fabric of the outerband may extend from the entire lower perimeter of the outerband in a skirt-like fashion. In this arrangement, when the outerband is in its upper position, the excess fabric extending from front portion 22 and the skirt surrounding the perimeter of the outerband may be folded upward, thereby covering and protecting lens 11 and goggle portion 22 whenever the outerband is in the upper position. The extended fabric may be secured to the top of the outerband or to the main hat portion by means of a Velcro attachment, a button/slit, or a button snap at any desired position.

Figure 5:
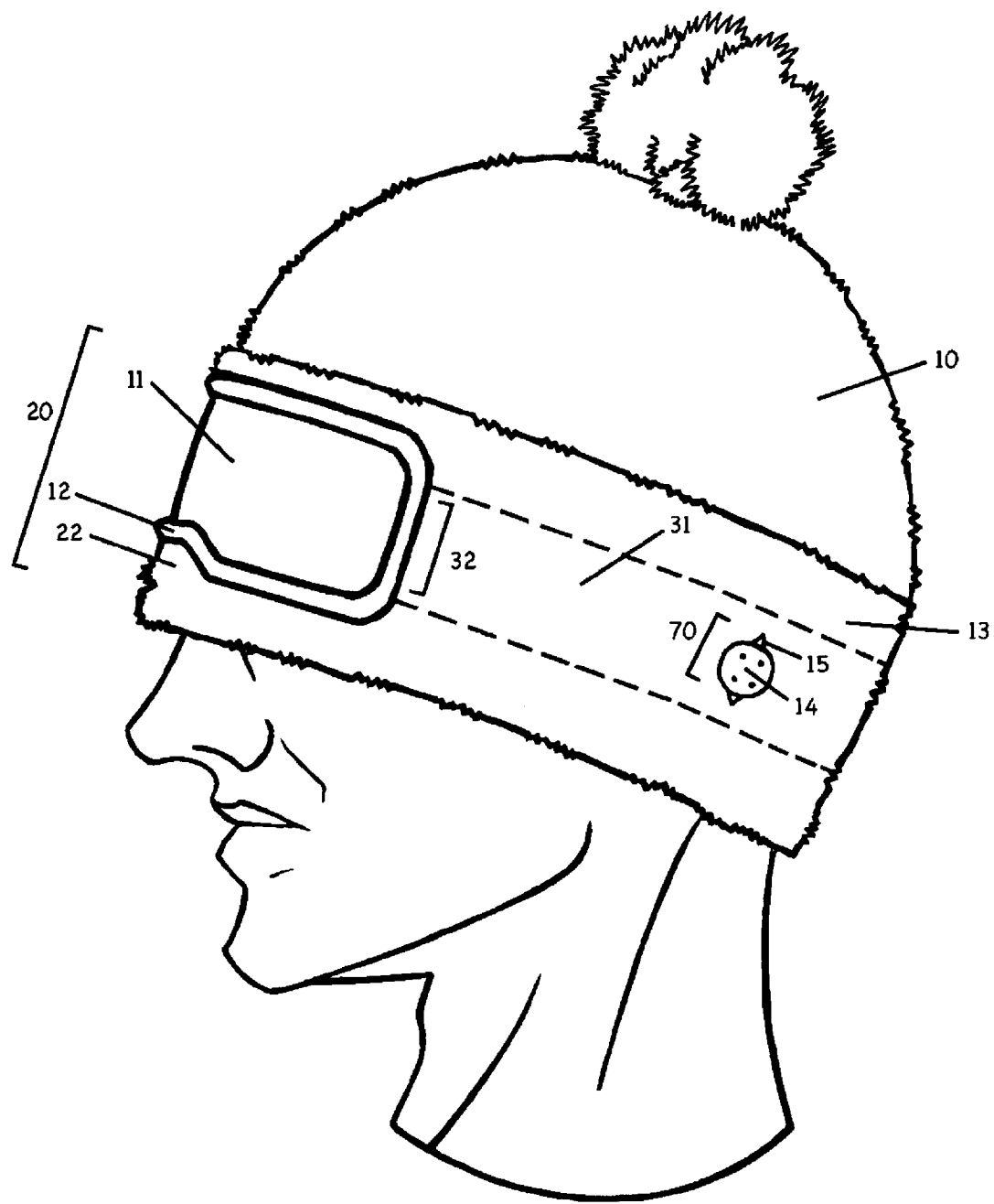
FIG. 5 is a side elevation of a hat according to a second embodiment of the invention with the outerband in its upper position.

In the alternative embodiment of the invention illustrated in FIG. 5, an elastic band 31 is embedded into outerband 13. Elastic band 31, as therein shown, begins on the left side of goggle 20 at point 32, wraps around the back of the outerband, and reconnects to goggle 20 at a similar point (not shown). The elastic band is preferably made of a flexible material so that after it is pulled or stretched out it retains its original shape.

Slit 15 and button 14 or pivoting area 70, in the embodiment of FIG. 5, may extend through elastic band 32. Pivoting area 70 may also be positioned above or below the elastic band. Elastic band 32 may extend over the full height and length of outerband 13, or may serve as a substitute for the outerband if the elastic band is sufficiently wide to fully encase the goggle portion 20 on its top and bottom.

Figure 6:
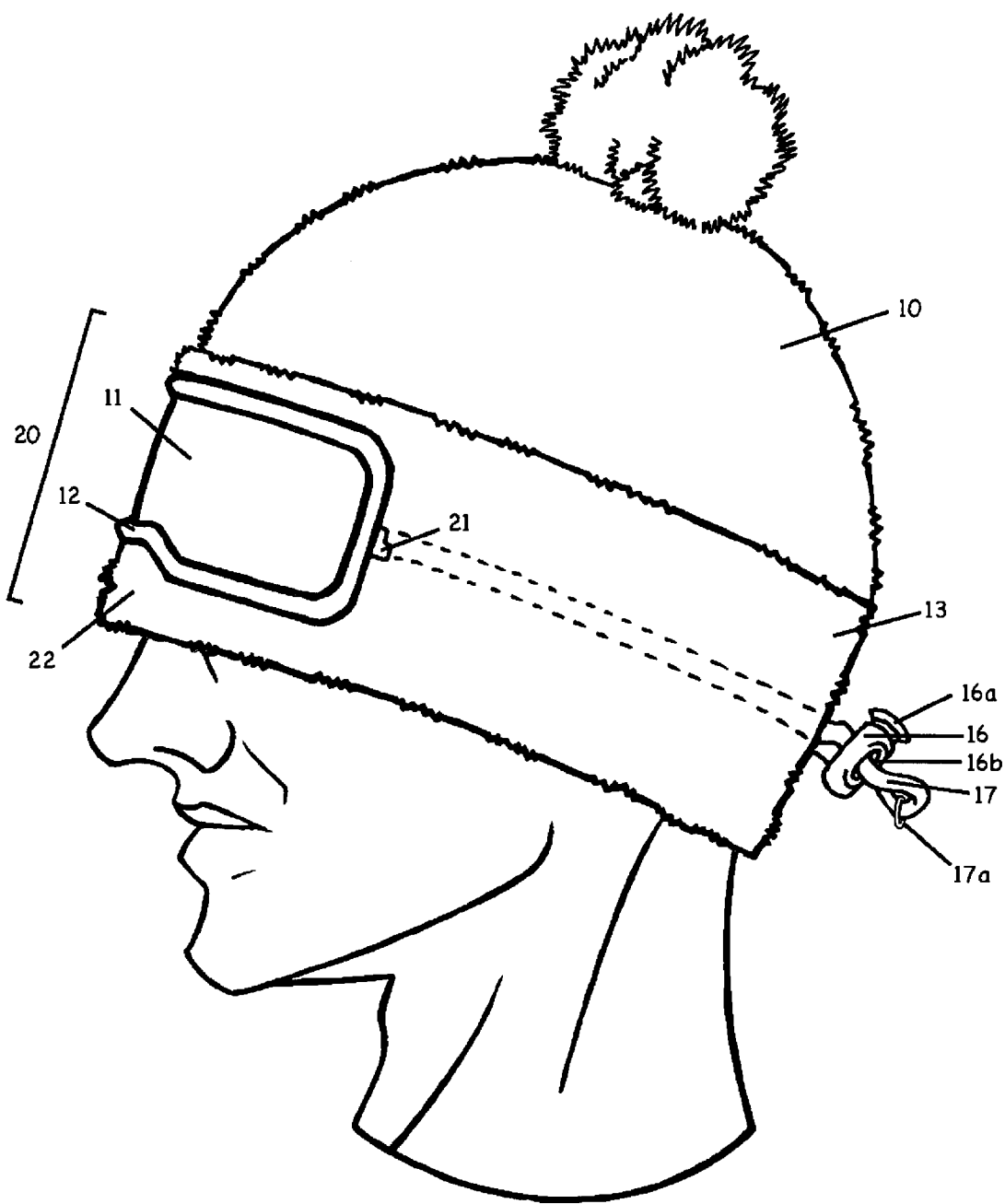
FIG. 6 is a side elevation of the hat of FIG. 5 with the outerband in its lower position.
Figure 7:
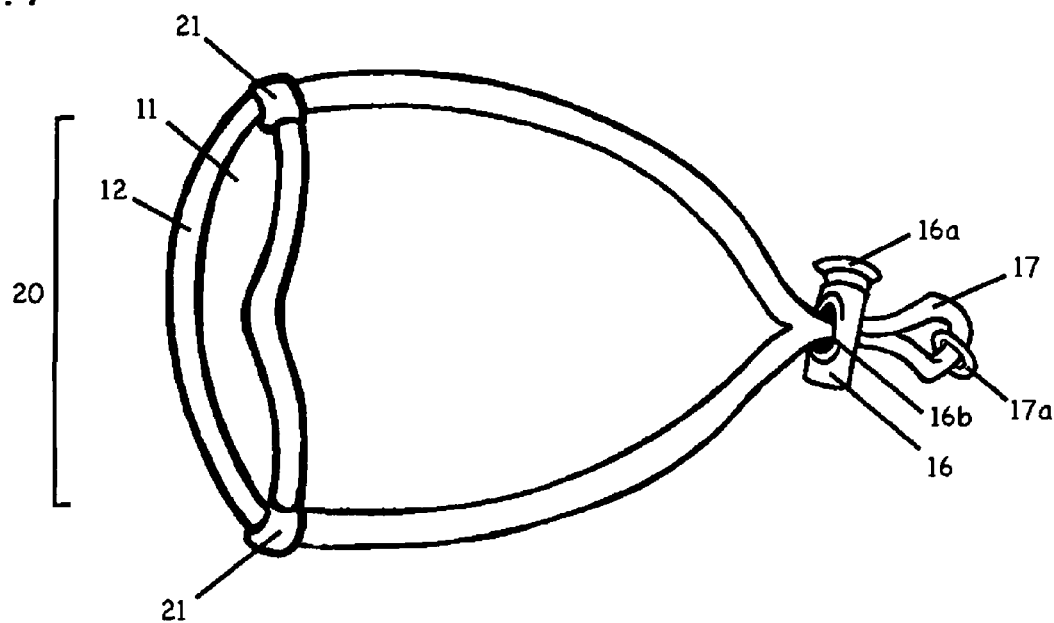
FIG. 7 is a top view of the hat of FIG. 6.

In the embodiment of the invention illustrated in FIG. 6, only the elastic strip 17 is included in the outerband with the cinchcord 17. The elastic strip is attached to the goggle portion 20 at point 21. FIG. 7 illustrates the elastic strip and goggle portion 20 when both are separated from the outerband as a possible alternate construction. Elastic band 31, Velcro tabs 18 and 19, and cinchcord 17 with chord lock 16 may be used separately or in combination.

Figure 8:
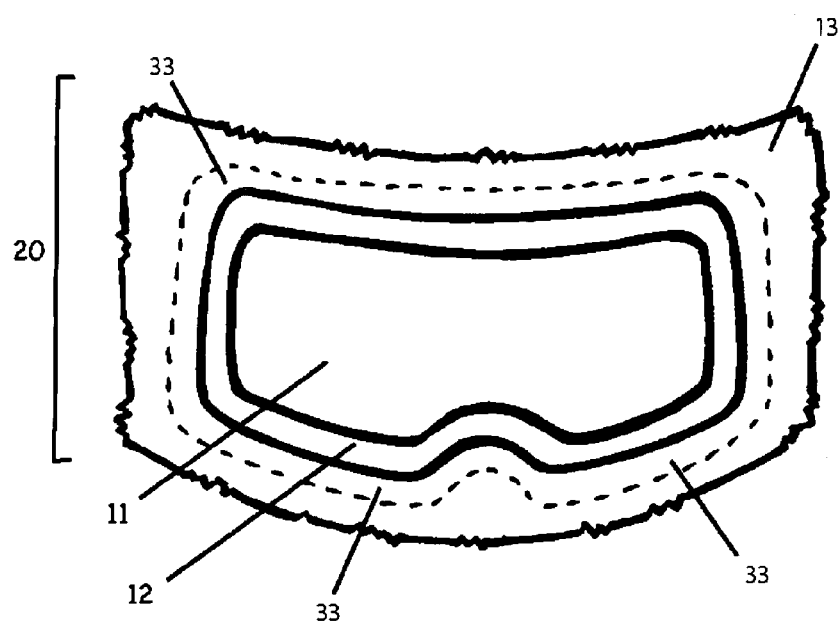
FIG. 8 is a detailed view of the outerband portion of the hat of the invention illustrating the manner in which the goggle or lens may be attached to the outerband.
Figure 9:
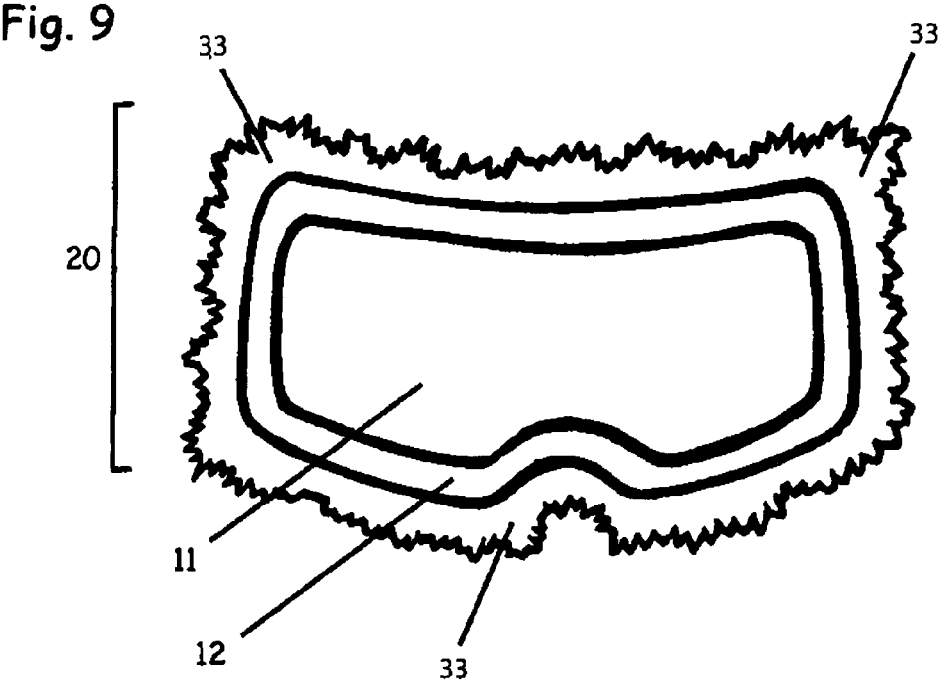
FIG. 9 is a front elevation of the goggle or lens of FIG. 8.

FIG. 8 illustrates a flange 33, whose perimeter is denoted by the broken lines, on the inside of the outerband 13. Flange 33 is embedded into the rubber/plastic encasement 12 of goggle portion 20, or it may be sewn or otherwise attached to the outerband to retain the goggle portion to the outerband. The flange 33, which is preferably about ¼ inch in width, completely surrounds goggle portion 20 and is embedded throughout the perimeter of rubber/encasement 12. FIG. 9 illustrates the construction of the goggle portion, shown for illustrative purposes only, as being removed from the outerband, thereby to expose flange 33.

Figure 10:
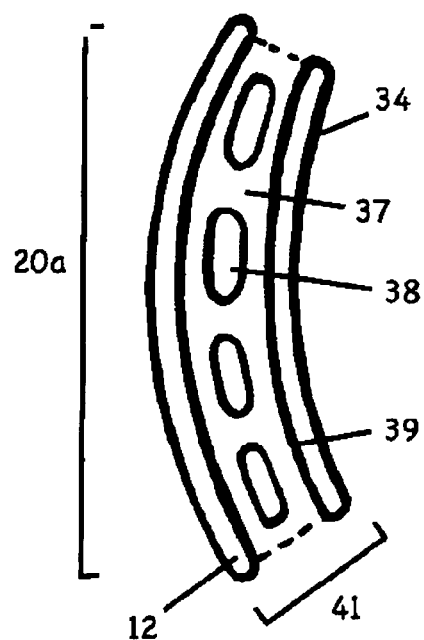
FIG. 10 is a top view of an alternate construction of the goggle portion.
Figure 11:
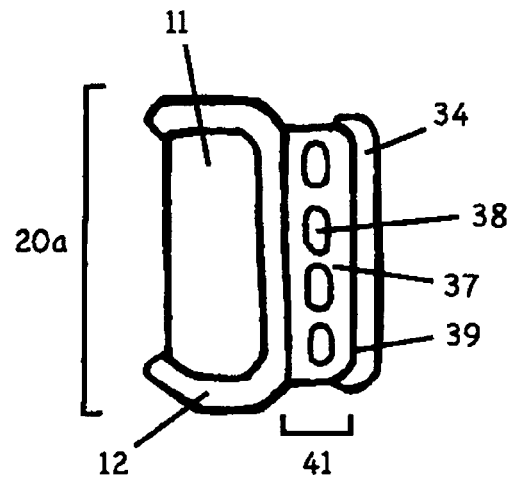
FIG. 11 is a side elevation of the goggle construction of FIG. 10.

FIGS. 10 and 11 illustrate an alternate construction of goggle portion 20a, again shown for illustrative purposes as being separated from the outerband. In this construction, goggle portion 20a is similar to a conventional ski goggle. Rubber/plastic encasement 12, which holds lens 11 and goggle portion 20a, extends deeper toward the wearer's face. Additional layers of rubber and plastic in the form of a goggle frame may be added, and layers of foam may be added to allow for greater ventilation. A rubber/plastic structure 37 and foam rubber 38 are combined to establish a ventilation area 41. Area 41 extends about the perimeter of goggle portion 20a and extends toward the wearer's face from the encasement 12. A rubber layer 34 extends about the interior perimeter of goggle portion 20a, specifically on the interior plastic frame 37, and contacts frame 37 at 39. Foam rubber layer 34 provides padding and increased comfort to the wearer.

Figure 12:
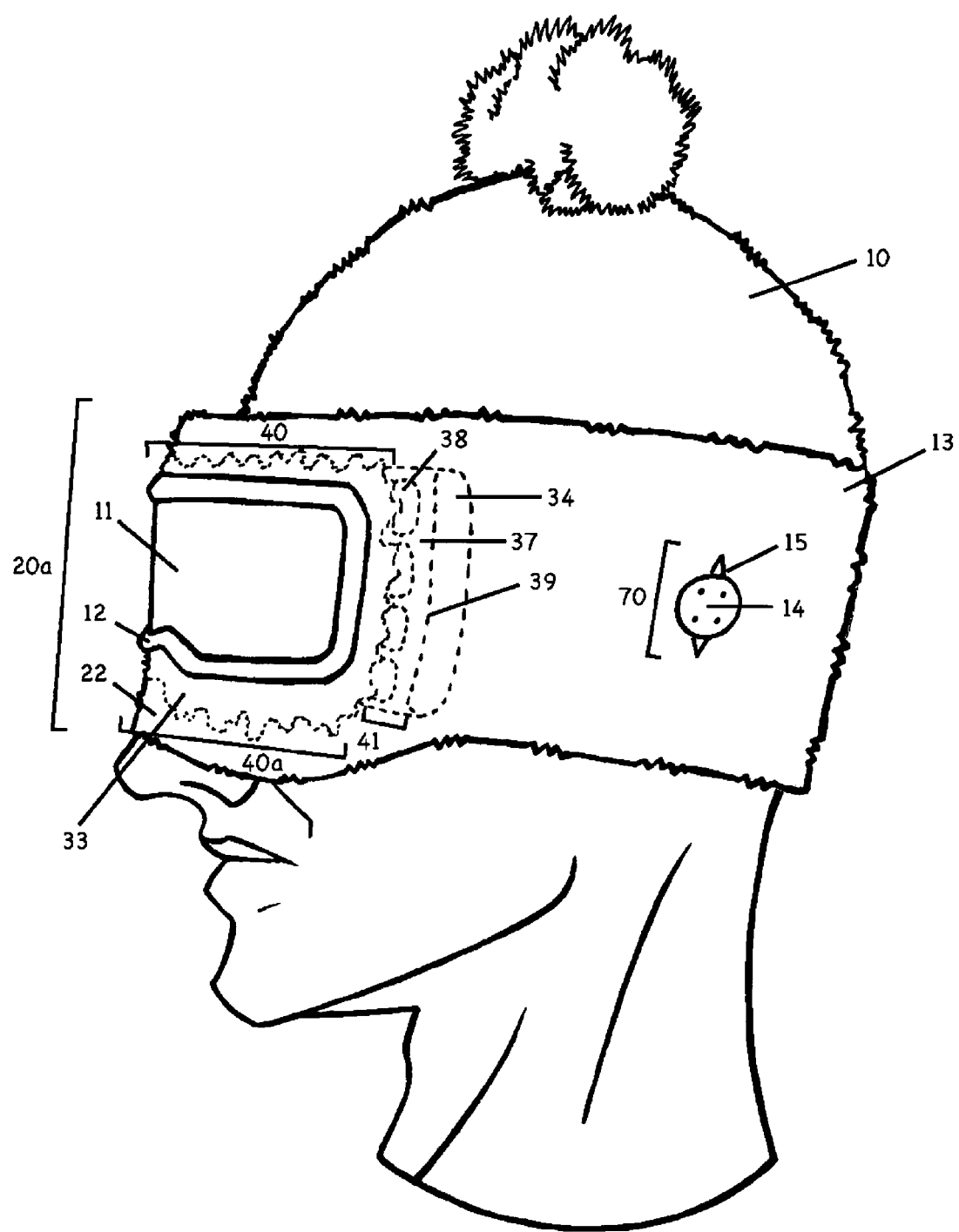
FIG. 12 is a side elevation of an another alternate hat construction embodying the present invention.

FIG. 12 illustrates an alternate embodiment of the invention in which the goggle portion of FIGS. 10 and 11 is embedded in outerband 13. Since goggle portion 20a is deeper than in the earlier-described embodiments, the fabric of the outerband is able to separate from the main hat portion 10, thereby to expose the top and bottom of air ventilation area 41 through upper and lower openings 40 and 40a. The air flowing through ventilation area 41 helps prevent the fogging of lens 11. Goggle portion 20a is sewn into the outerband by means of flange 33 being attached or embedded into rubber/plastic portion 12, which in turn is sewn to the interior of the outerband.

Figure 13:
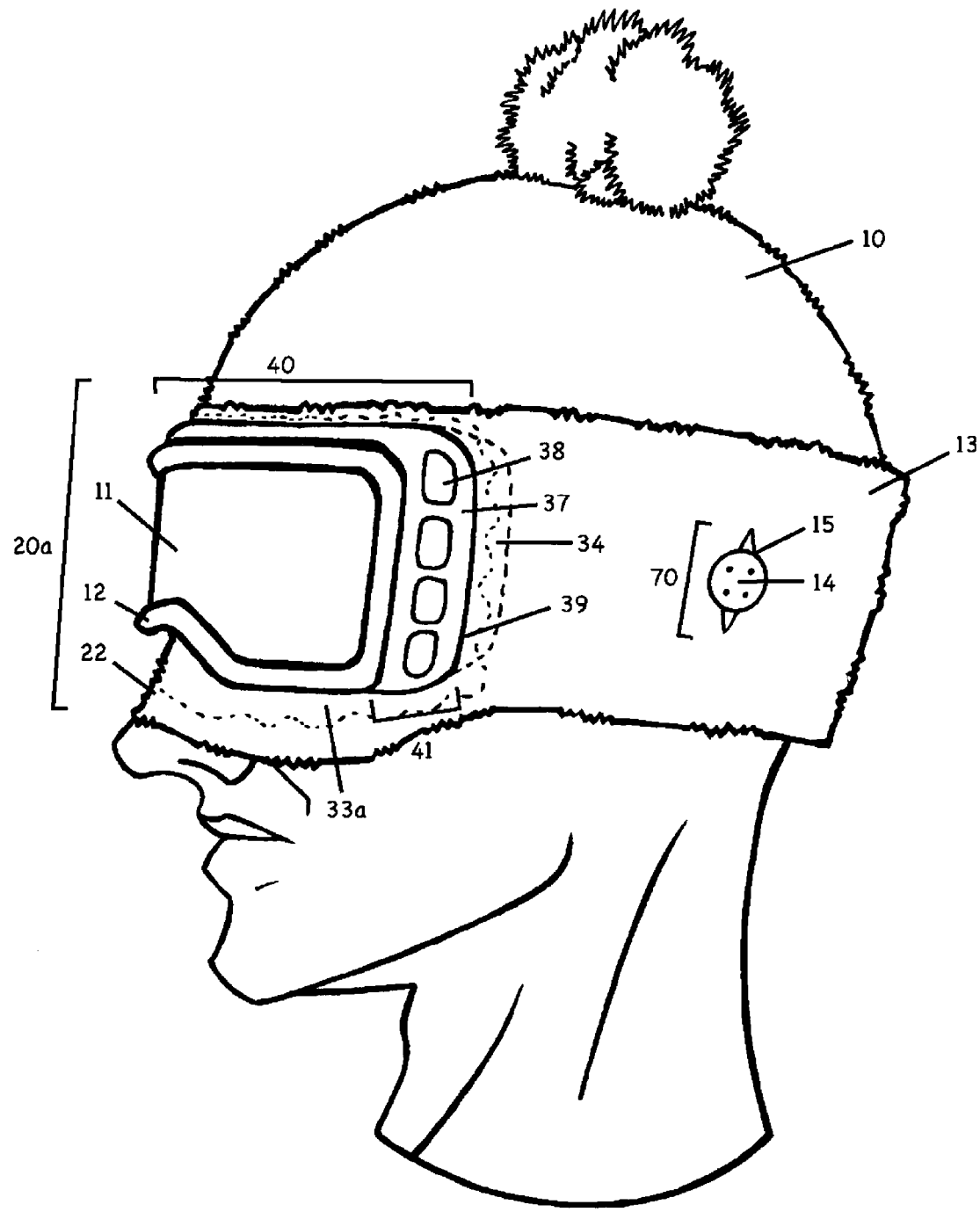
FIG. 13 is a side elevation of yet another alternate goggle construction that may be used in the hat of the invention.

In the embodiment of the invention illustrated in FIG. 13, flange 33a is embedded or built into goggle portion 20a along line 39, which surrounds the perimeter of goggle portion 20a. Flange 33a surrounds the inner perimeter of ventilation area 41, and is embedded between plastic/rubber encasement 37 and foam rubber layer 34. Flange 33a is then sewn into outerband 13. This leaves ventilation area 41 exposed to the air allowing the flow of ventilating air from the top and sides of ventilation area 41. Foam rubber portions 38 are provided about the exterior of the outerband and foam rubber layer 34 is on the outerband interior and rests comfortably on the wearer's face. The nose piece 22 is in its normal position as in previous embodiments; however, because of the formation of the ventilation area 41, goggle portion 20a extends further out from the wearer's face and from the nose piece.

Figure 14:
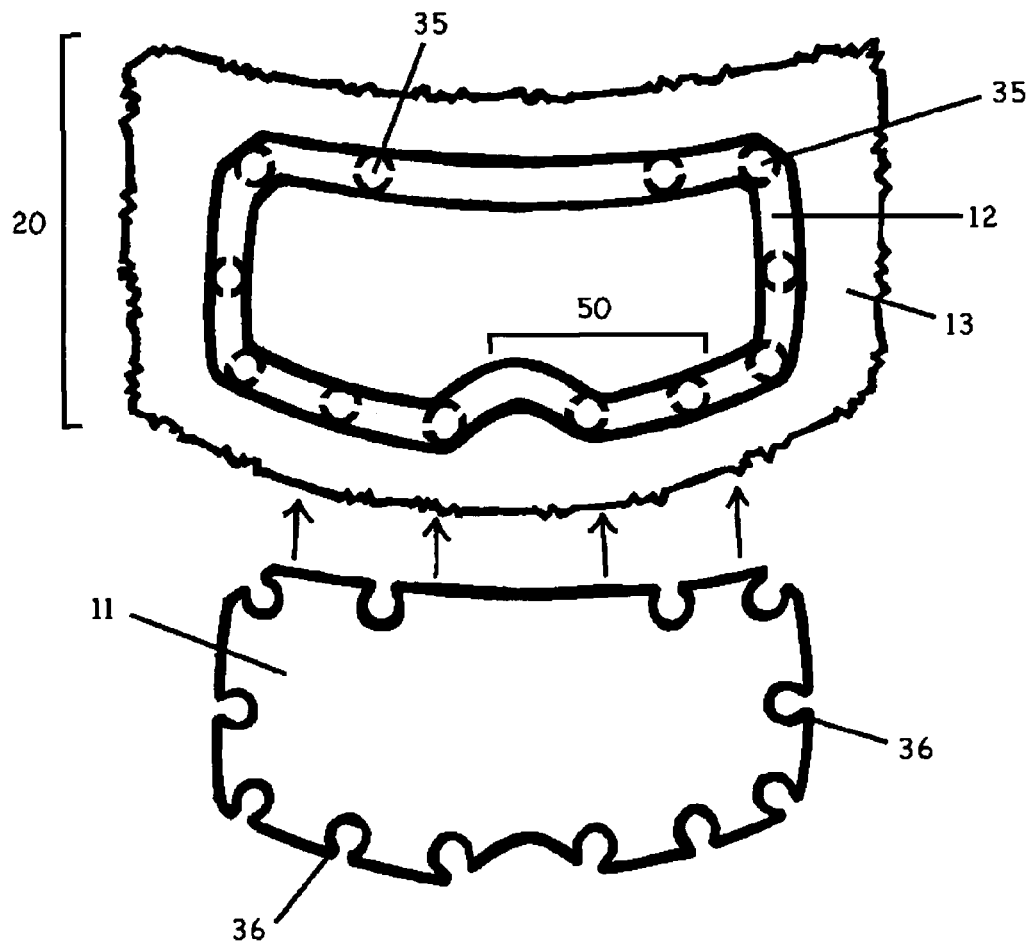
FIG. 14 is an exploded view of the goggle portion showing how it may be removed from and secured to the outerband.
Figure 15:
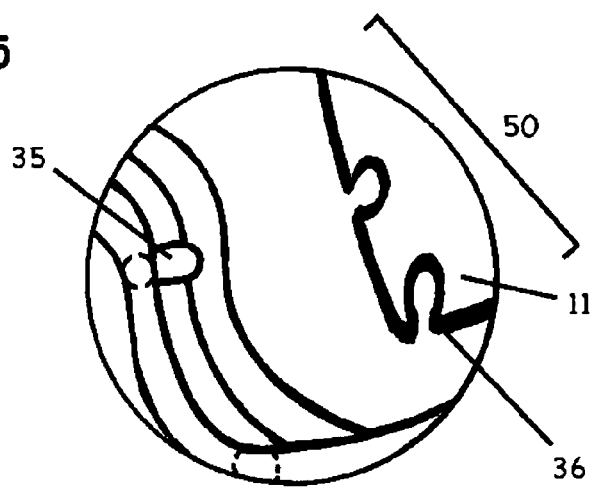
FIG. 15 is a detailed view of a portion of the goggle of FIG. 14.

FIGS. 14 and 15 illustrate a front view of an alternate goggle portion, in which rubber/plastic encasement 12 is embedded in the outerband 13. The goggle lens 11 is shown removed from the encasement 12 in which a plurality of spaced pegs 35 are embedded. As shown in the detail of area 50 illustrated in FIG. 15, the pegs 35 are received within slots or openings 36 formed about the periphery of lens 11 to removably attach the lens to the rubber/plastic encasement.

Figure 16:
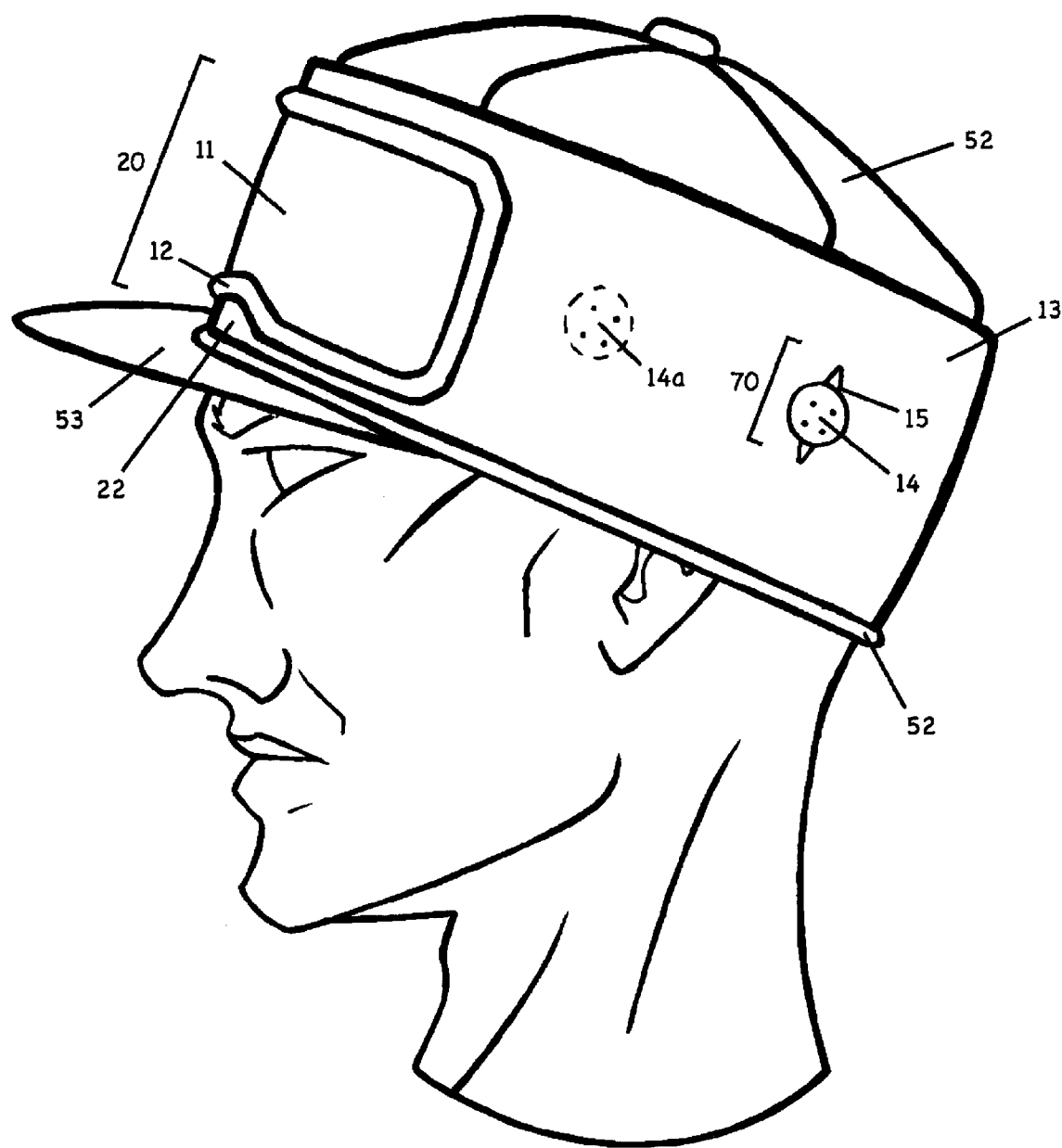
FIG. 16 is an elevation of a further embodiment of the invention.

FIG. 16 illustrates yet an alternate embodiment of the invention in which outerband 13 is attached to a baseball cap 52 having a brim 53. Outerband 13 is pivotable up and down at pivoting area 70 as in the previously described embodiments. Pivoting area 70 may also be located at different positions on cap 52 and outerband 13, or in the front or rear of cap 52. To pivot the elastic outerband to its lower, protective position, the wearer pulls the outerband away from his face, past the brim 53, and then lowers it over his eyes. A button 14a indicated by the broken lines is sewn in cap 52 near the front of the cap at a location at which it is underneath the outerband. Button 14a is used only when the cap is worn backwards and outerband 13 is removed from its original position and positioned forward so that goggle portion 20 rests on the wearer's forehead. Button 14a is inserted through slit 15, and the outerband readily pivots up and down as it does in the embodiment of FIGS. 1-4.

Alternatively, goggle portion 20 and its frontal surrounding fabric may be of a convertible construction in relation to the outerband. The attachment of the goggle portion may be achieved by the use of Velcro, a button snap, or a button/slit arrangement, and may be located on both sides of goggle portion 20. In use, while outerband 13 is in its up position, the wearer would detach the fabric on one side of the goggle portion, slide the outerband to its down position, and then reattach the fabric on the side of the goggle portion.

Figure 1A:
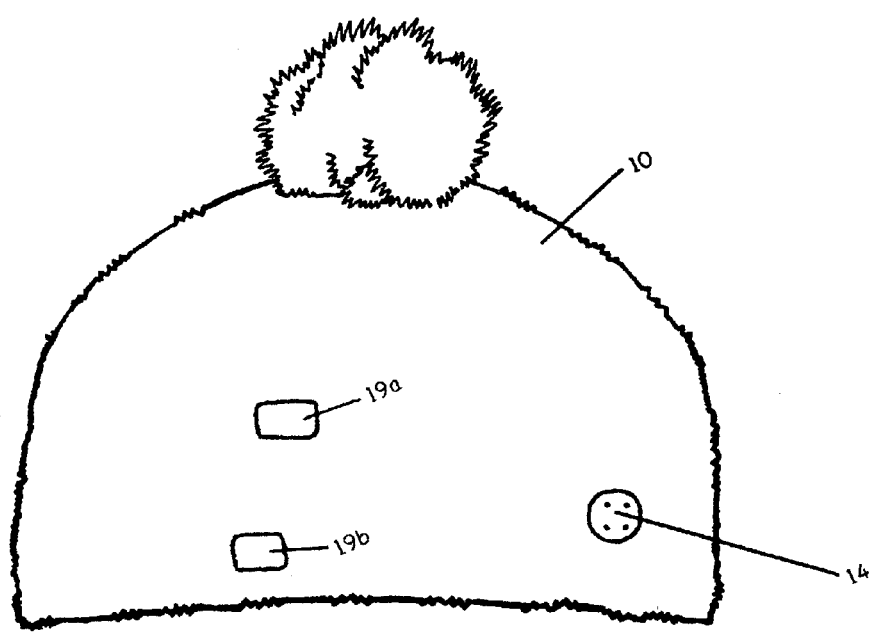
FIG. 1A is a side elevation of the hat of FIG. 1 shown with the outerband separated from the main hat portion.
Figure 1A:
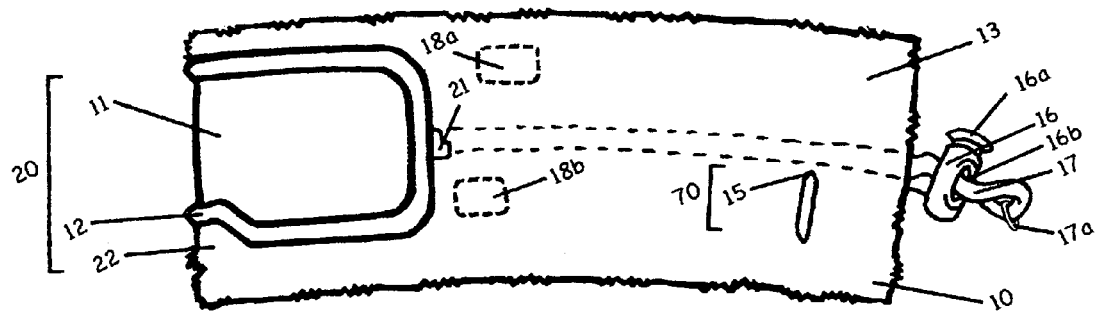

Buttons 14 and 14a removably secured to the outerband allow, as shown in FIG. 1A, the wearer to remove the outerband during warmer weather when protection against ice and snow is not required and can reattach the outerband to the cap when weather conditions worsen. This convertibility feature of the invention also allows the outerband to be affixed to a variety other articles such as hats, jackets, hooded sweatshirts, ski masks, headbands or visors, which would be provided with a button such as the button 14 or 14a described above.

It will be appreciated from the foregoing disclosure that the present invention has been described with respect to several presently preferred embodiments thereof. It will be further appreciated that the embodiments of the invention hereinabove described are merely illustrative in nature, and that variations may be made to the above-described embodiments, such as the attachment of the hat to a jacket or sweatshirt or to a baseball cap, visor, topless visor, ski mask, headband, or any other type of headwear without necessarily departing from the spirit and scope of the invention.

What is claimed is:

1. A hat or cap comprising a main hat portion and an outerband; cooperating means on said main hat portion and on said outerband for separably and frictionally securing said outerband to the lower portion of said main hat portion and for allowing relative upward and downward movement of said outerband with respect to said main hat portion between a first, upward position and a second, downward position, wherein the inner surface of said outerband lies adjacent to and substantially parallel to said main hat portion when said outerband is in its said first, upward position, said outerband, when separated from said main hat portion, being separately wearable as a head band, said outerband comprising a continuous, one-piece sleeve-like member sized to fit about the wearer's head and having a goggle-receiving opening formed therein; and a goggle received within and permanently secured about its entire outer periphery to the inner periphery of said opening and surrounded by the material of said outerband; said outerband being movable about said frictional cooperating securing means with respect to said main portion between said first, upper position in which it frictionally remains in place while it overlies the lower end of said main hat portion and in which said outerband and said goggle are positioned upward and away from the wearer's face and eyes, and said second, lower position in which said outerband lies over and covers at least a portion of the wearer's face and said goggle overlies and protects the wearer's eyes, wherein the inner surface of said goggle lies substantially parallel to the wearer's eyes and wherein the inner material of said outerband surrounding said goggle rests upon and substantially conforms to and protects the wearer's forehead, cheekbones and nose.

2. The hat of claim 1, further comprising goggle-securing means comprising a rubber/plastic encasement secured to said outerband about the perimeter of said opening.

3. The hat of claim 2, further comprising adjusting means secured to said goggle-securing means for selectively, manually tightening and loosening said outerband when said outerband is in its second, lower position.

4. The hat of claim 1, in which one of said cooperating securing means is a button, and the other of said cooperating securing means is a slit for receiving said button.

* * * * *